(12) United States Patent
Duan et al.

(10) Patent No.: US 10,718,204 B2
(45) Date of Patent: Jul. 21, 2020

(54) IDENTIFYING FLUID LEVEL FOR DOWN HOLE PRESSURE CONTROL WITH DEPTH DERIVATIVES OF TEMPERATURE

(71) Applicant: Halliburton Energy Services, Inc., Houston, TX (US)

(72) Inventors: Hongyan Duan, Houston, TX (US); Mikko Jaaskelainen, Katy, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 203 days.

(21) Appl. No.: 15/568,218

(22) PCT Filed: Jun. 15, 2015

(86) PCT No.: PCT/US2015/035871
§ 371 (c)(1),
(2) Date: Oct. 20, 2017

(87) PCT Pub. No.: WO2016/204725
PCT Pub. Date: Dec. 22, 2016

(65) Prior Publication Data
US 2018/0119539 A1    May 3, 2018

(51) Int. Cl.
*E21B 47/04* (2012.01)
*E21B 47/12* (2012.01)
(Continued)

(52) U.S. Cl.
CPC ........ *E21B 47/042* (2013.01); *E21B 47/1005* (2013.01); *E21B 47/123* (2013.01); *G01K 11/32* (2013.01); *G01K 2011/324* (2013.01)

(58) Field of Classification Search
CPC .................................................... E21B 47/042
See application file for complete search history.

(56) References Cited

U.S. PATENT DOCUMENTS 3,480,079 A * 11/1969 Wright .................... E21B 43/25
166/250.01
2008/0317095 A1 * 12/2008 Hadley ................... E21B 36/04
374/137
(Continued)

FOREIGN PATENT DOCUMENTS

CA        2551283 A1    12/2004
WO     2012166137 A1    12/2012

OTHER PUBLICATIONS

Canadian Application Serial No. 2,978,549; Second Office Action; dated Mar. 1, 2019, 4 pages.
(Continued)

*Primary Examiner* — Matthew G Marini
(74) *Attorney, Agent, or Firm* — Gilliam IP PLLC (57) ABSTRACT

Given a number of temperature measurements, such as from a Distributed Temperature Sensing System (DTS), at various depths in a wellbore, a derivative of temperature with respect to depth can be calculated. A fluid boundary can then be identified where the depths below the boundary corresponds to the presence of fluid and a low fluctuation regime in the derivative of temperature with respect to depth, and the depths above the boundary correspond to the absence of fluid and a high fluctuation regime in the derivative of temperature with respect to depth.

20 Claims, 7 Drawing Sheets

(51) Int. Cl.
*E21B 47/10* (2012.01)
*G01K 11/32* (2006.01)

(56) References Cited

U.S. PATENT DOCUMENTS

2014/0075297 A1* 3/2014 Gunturu ................ G06T 11/206
715/251
2015/0120194 A1* 4/2015 Chen ....................... E21B 47/00
702/6

OTHER PUBLICATIONS

Canadian Application serial No. 2,978,549; Examiner's Letter; Jul. 3, 2018, 5 pages.
"International Application Serial No. PCT/US2015/035871, International Search Report dated Feb. 29, 2016."
"International Application Serial No. PCT/US2015/035871, Written Opinion dated Feb. 29, 2016."
CA Application Serial No. 2,978,549, Office Action, dated Sep. 30, 2019, 5 pages.

* cited by examiner

Collect DTS temperature data in matrix with dimension of [mxn].

m -number of samples in depth scalen - number of samples in time scale               110

For each column of the DTS matrix, apply derivative of temperature corresponding to depth.

Result of derivative is restored in a new matrix with dimension of [m-2 x n]. The first and last row of the DTS matrix can not be applied with depth derivative.               120

Plot new derivative matrix in MatLab or other viewing software with horizontal axis as time, vertical axis as depth and color coded as value of temperature derivative.               130

Adjust color scheme of the derivative plot between [-a ,a] until a boundary is found through whole production period above lateral. Above this boundary, horizontal stripes of negative and positive value (red-blue color stripe in color version) lay alternately. Below this boundary, either positive or negative value dominates. The observed boundary indicates fluid level in annulus between tubing and casing as function of time.               140

If pressure (either treating or downhole) data is available, it can be plotted in the same time scale as the derivative image. One can find that the boundary observed from derivative fluctuates in a very similar profile as pressure plot does. It can be a substitute if pressure data is not available.               150

IDENTIFYING FLUID LEVEL FOR DOWN HOLE PRESSURE CONTROL WITH DEPTH DERIVATIVES OF TEMPERATURE

BACKGROUND

This disclosure relates generally to temperature sensing, and more particularly, to the use of new methodologies for interpreting distributed temperature sensing information.

Fiber optic Distributed Temperature Sensing (DTS) systems were developed in the 1980s to replace thermocouple and thermistor based temperature measurement systems. DTS technology is often based on Optical Time-Domain Reflectometry (OTDR) and utilizes techniques originally derived from telecommunications cable testing. Today DTS provides a cost-effective way of obtaining hundreds, or even thousands, of highly accurate, high-resolution temperature measurements, DTS systems today find widespread acceptance in industries such as oil and gas, electrical power, and process control.

DTS technology has been applied in numerous applications in oil and gas exploration, for example hydraulic fracturing, production, and cementing among others. The collected data demonstrates the temperature profiles as a function of depth and of time during a downhole sequence. The quality of the data is critical for interpreting various fluid movements.

The underlying principle involved in DTS-based measurements is the detection of spontaneous Raman backscattering. A DTS system launches a primary laser pulse that gives rise to two back-scattered spectral components. A Stokes component that has a lower frequency and higher wavelength content than the launched laser pulse, and an anti-Stokes component that has a higher frequency and lower wavelength than the launched laser pulse. The anti-Stokes signal is usually an order of magnitude weaker than the Stokes signal (at room temperature) and it is temperature sensitive, whereas the Stokes signal is almost entirely temperature independent. Thus, the ratio of these two signals can be used to determine the temperature of the optical fiber at a particular point. The time of flight between the launch of the primary laser pulse and the detection of the back-scattered signal may be used to calculate the spatial location of the scattering event within the fiber.

Artificial lift refers to the use of artificial means to increase the flow of liquids, such as crude oil or water, from a production well. Generally this is achieved by the use of a mechanical device inside the well (known as pump or velocity string) or by decreasing the weight of the hydrostatic column by injecting gas into the liquid some distance down the well. Artificial lift is needed in wells when there is insufficient pressure in the reservoir to lift the produced fluids to the surface, but often used in naturally flowing wells (which do not technically need it) to increase the flow rate above what would flow naturally. The produced fluid can be oil, water or a mix of oil and water, typically mixed with some amount of gas.

Electric Submersible Pumps (ESP) is one of the important devices for artificial lift production. ESP consists of a downhole pump (a series of centrifugal pumps), an electrical motor which transforms the electrical power into kinetic energy to turn the pump, a separator or protector to prevent produced fluids from entering the electrical motor, and an electric power cable that connects the motor to the surface control panel. ESP is a very versatile artificial lift method and can be found in operating environments all over the world. They can handle a very wide range of flow rates (from 200 to 90,000 barrels (14,000 m$^3$) per day) and lift requirements (from virtually zero to 10,000 ft. (3,000 m) of lift). Operators of ESP systems have to monitor the casing fluid level carefully to balance between production and protection. Large production rate requires a large pressure drop from the reservoir to the bottom hole of the well, which lowers the fluid level in the casing. However, the fluid level has to be kept above the ESP to a certain level so that the pump is not starved of the fluid it needs for cooling. If the fluid level is too low, an under-load condition will shut down the pump, potentially leaving the well productionless for hours, while the well fluid level increases as fluids flow from the reservoir into the well and refill the well bore to a safe level above the ESP.

Besides ESP protection, fluid level, playing a role of pressure indicator, can be used for monitoring down hole pressure change to control the production rate. Production optimization attempts to minimize water production rate while maximizing oil and gas rate. Due to different capillary pressure between oil and water and surface tension between formation rock and different fluids like water and oil, flow rate of oil, water and gas is different at different depth of the well under different draw down pressures. By monitoring the down hole pressure, an optimization can be reached to find the highest OWR (oil water ratio). Fluid level detection and monitoring is critical and often done using down hole gauge(s), but other means of fluid level monitoring are desirable especially when calibration or replacement is required of the down-hole pressure gauge.

When DTS fiber is installed along the production well, DTS data is plotted in time-depth scale to monitor the temperature along the wellbore. Besides the production intervals, DTS data can also be used in many other functions. One of them is fluid level detection. However, conventional DTS plots are not able to give a clear profile of the fluid level in time scale. Air and foam above the fluid level causes a much more unstable temperature comparing with the one below the fluid level. Variation of the temperature above the fluid level is however too small to be observed from the DTS plot itself due to its large temperature range as 70 F to 200 F.

There is a need then for better analysis tools to detect fluid level changes.

DETAILED DESCRIPTION

In the following detailed description, reference is made to accompanying drawings that illustrate embodiments of the present disclosure. These embodiments are described in sufficient detail to enable a person of ordinary skill in the art to practice the disclosure without undue experimentation. It should be understood, however, that the embodiments and examples described herein are given by way of illustration only, and not by way of limitation. Various substitutions, modifications, additions, and rearrangements may be made without departing from the spirit of the present disclosure. Therefore, the description that follows is not to be taken in a limited sense, and the scope of the present disclosure will be defined only by the final claims.

The earlier discussion described the need for better analysis tools for operators to detect fluid level changes in production wells.

In this disclosure we describe depth derivative as a better analysis tool that can do the job excellently. Depth derivative of DTS data is derived by to subtracting temperatures at a depth from the temperatures at a next deeper depth. The difference is then divided by the distance between two depths. Depth derivative of DTS plots the temperature change in depth scale of all the time. It captures the small changes despite the absolute value of the temperature.

Depth derivative of the DTS can range from −0.3 to +0.3 degrees F./foot. It is able to capture the fluctuation regardless of the absolute temperature. In a derivative map, a clear fluid level boundary can be observed along the time axis. A variance algorithm is used in this disclosure later to identify this boundary mathematically so that the result can be obtained in real time as an important tool to monitor the fluid level. It has been proved to be highly consistent with bottom hole pressure gauge readings. Once DTS fiber is installed, it can work as a tool to monitor the fluid level and down hole pressure.

Figure 2:
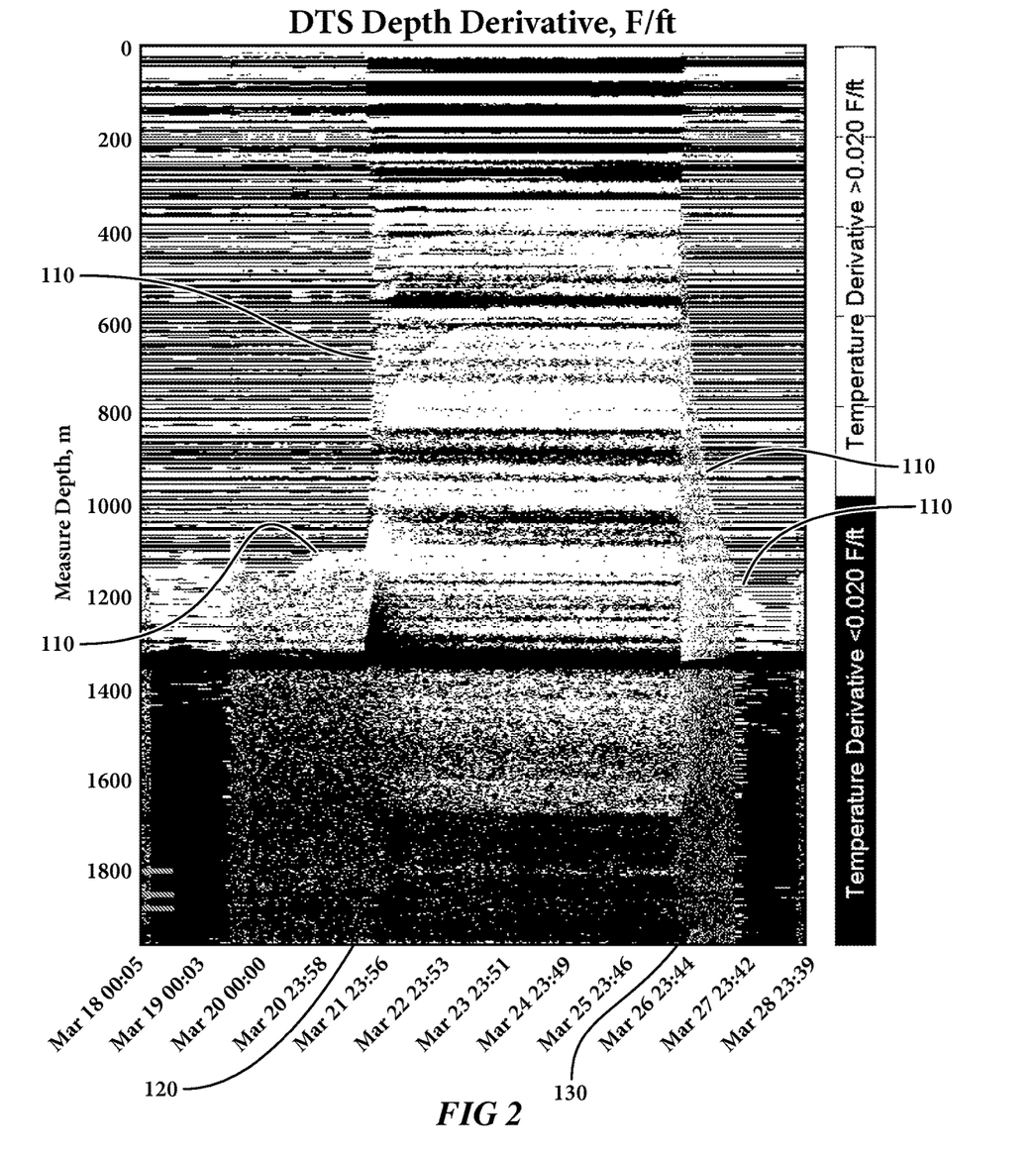
FIG. 2 illustrates the same DTS data displayed as the DTS derivative data in the depth and time scale.

Referring first to FIG. 2, depth derivative of DTS data is displayed for a production and shut-in process that has experienced a shut-in 120 and a restart 130. On earlier times before shut-in and later time after restart periods the depth derivative data clearly shows the fluid levels 110. This is easily seen in this black and white rendering and can be seen in a full color rendering in which a red color can indicate a temperature increase along the depth and a blue color represents a decrease.

In use this data will normally be displayed in full color to show temperature changes. Color presentations cannot be used in patent applications so this data is being shown in a black/white scale that still shows the significant improvement in information available using derivative data to show the various boundaries during the production processes.

Figure 3:
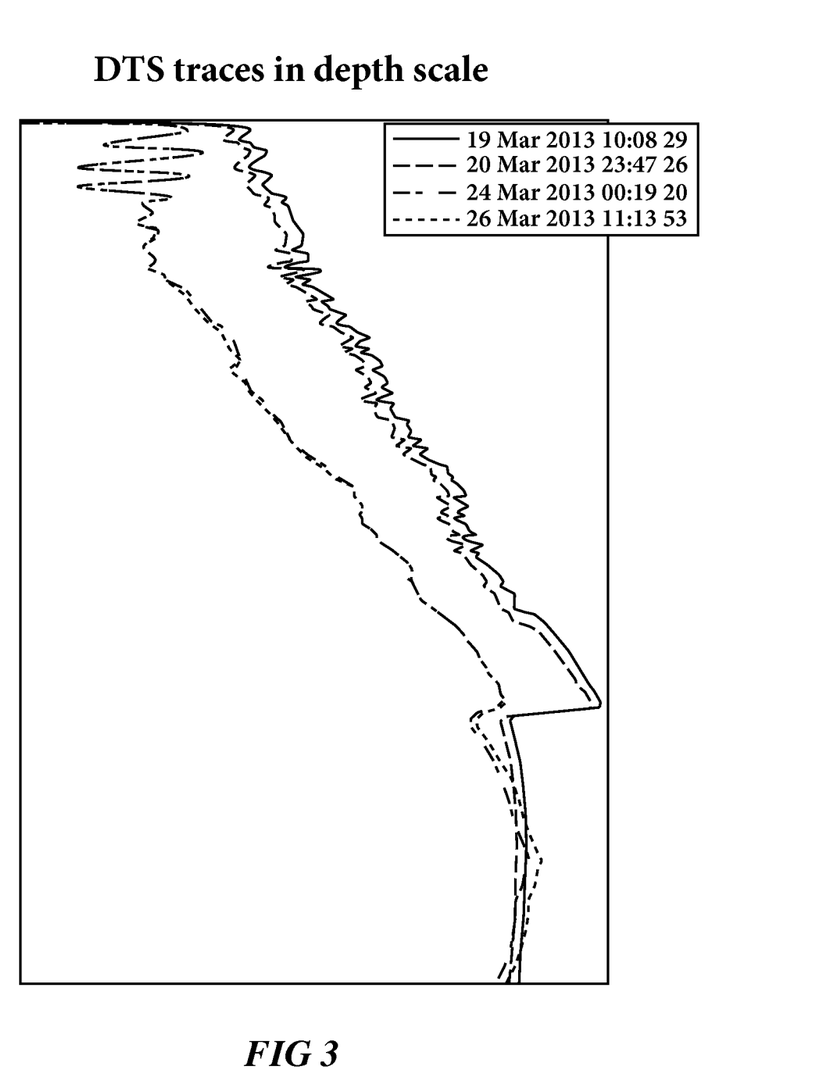
FIG. 3 is the same DTS data shown as a trace in the depth scale only.

In the more conventional DTS plot (FIG. 1) the fluid level is more difficult to assess because the color scales are normally set to simultaneously cover both cool area above the ESP and warm areas at the production intervals. The result is that much less information of use to an operator is available from this conventional display. A third alternative of a DTS trace plot in depth scale (FIG. 3) is able to roughly show a boundary by identifying the fluctuation on the trace. It however highly depends on the trace picked and involves human error.

This example clearly shows the power of a new tool in interpreting fluid levels during production.

Figure 4:
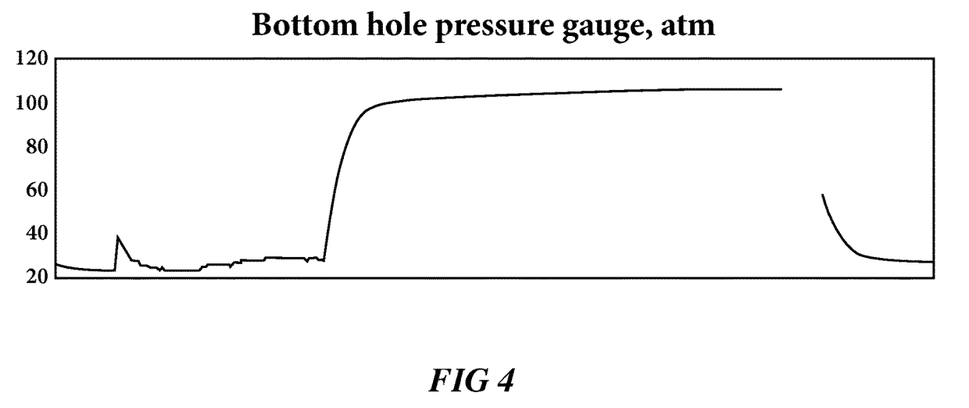
FIG. 4 illustrates the readings from the bottom hole pressure gauge.

A further example using this same data (FIGS. 4 and 5) compares the readings from the bottom hole pressure gauge and the DTS depth derivative. A variance algorithm described in a later section is applied to the derivative data and calculated as a fluid level profile along time, plotted as dash line on the derivative map. The variance threshold used in the algorithm is 0.001 in this example. A value 0.002±0.0015 can be a universal reference to differentiate noise variance of the temperature derivative above and below the fluid level. The results are highly consistent and more information is available in the derivative plot.

This method can be described as using the depth derivative of distributed temperature sensing data to identify fluid levels as a tool of downhole pressure control including at least: providing a fiber optic based distributed temperature sensing measurement system through a production region; gathering the temperatures through the production region as a function of the depth in the subsurface well and as a function of the elapsed time; calculating from the gathered data the depth derivative of the temperature changes as a function of depth in the subsurface well and of the elapsed time; displaying the depth derivative data for analysis of the fluid levels by operators.

The fiber optic sensing cable may also have other fibers that may be used for other sensing systems like for example Distributed Acoustic Sensing (DAS) systems. Acoustic energy will travel at different velocities in liquids and air, and can be a complementary system to enable automation of a fluid level monitoring system. Acoustic energy will also attenuate differently in liquids and air, so changes in acoustic velocities and/or amplitude changes in various frequency bands may be used for fluid level detection. DAS data can then be used in conjunction with the depth derivative data to better identify and validate the analysis of fluid levels.

Furthermore the depth derivative data can be presented in a number of ways. In one embodiment the actual numerical values of the depth derivative data are recorded and printed or displayed. In another embodiment the depth derivative data can be displayed in colors as a function of depth and time on a display monitor. In another embodiment the depth derivative data can be displayed in gray scale as a function of depth and time on a display monitor.

Generation of Derivative DTS Data

The disclosure herein anticipates any mathematically correct manner of generating the derivative data. The example embodiment for calculating the depth derivative is explained as follows.

Derivative data from DTS data can be generated by feeding the numerical data of temperature as a function of depth and time into a matrix and then computationally moving through all of the matrix data points to calculate derivative values for each matrix element. This can be done as either depth derivatives or as time derivatives. These derivative values can then be presented as a matrix of numbers, or, more usefully can be presented as color images in which the various colors represent different values of the derivatives. As discussed earlier, they are presented herein as gray scale images which show important features that are not evident in the presentation of the conventional DTS data alone.

Depth Derivative of DTS:

In this example the computation language MATLAB is used to compute regular DTS data into depth derivative of DTS. And the result can then be plotted by MATLAB in depth-time scale.

For DTS measurement, Temperature is function of depth and time:

$$T=T(\text{depth},\text{time}) \quad (1)$$

Data is loaded into MATLAB and stored as a DTS temperature matrix. See the first matrix in FIG. 6.

Figure 6:
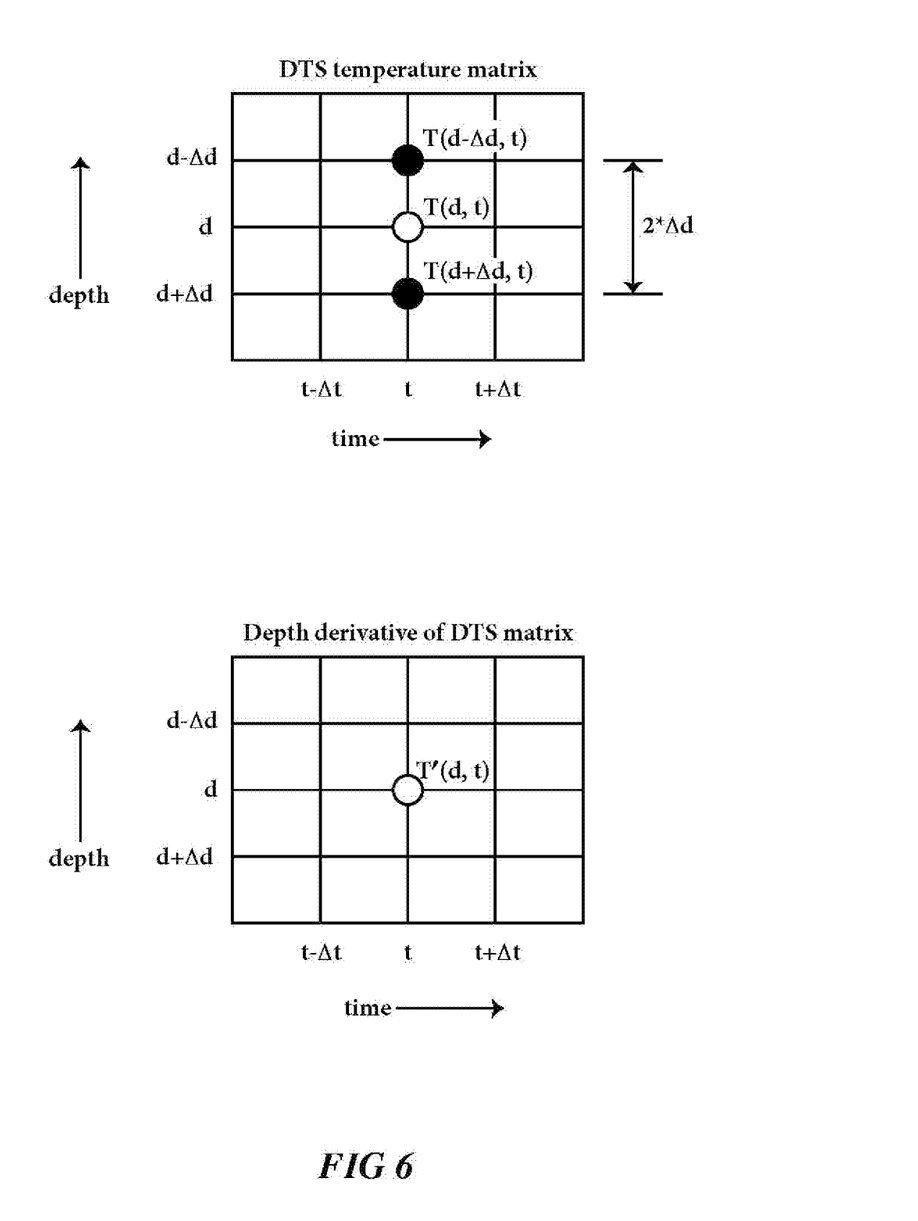
FIG. 6 illustrates the data matrices representing the DTS data for representing the depth derivative display.

The depth derivative of DTS, also called the DTS depth gradient, is then computed as:

$$\hat{T}' = \frac{T(d + \Delta d, t) - T(d - \Delta d, t)}{2 * \Delta d} \quad (2)$$

The depth derivative at any depth and time step is calculated by subtracting the temperature at its previous depth from the one at its next depth and the result is divided by the distance between these two depths. This results in a depth derivative of the DTS temperature matrix, shown as the second matrix in FIG. 6, wherein each point is a derivative data point to be displayed.

Both the DTS temperature matrix and DTS derivative matrix can be plotted as a depth-time 2D color map by MATLAB function pcolor(d,t,T) or pcolor(d,t,T'). Input parameters d and t are depth and time vectors. Input T is a 2D matrix with number of rows as d and number of columns as t.

Figure 7:
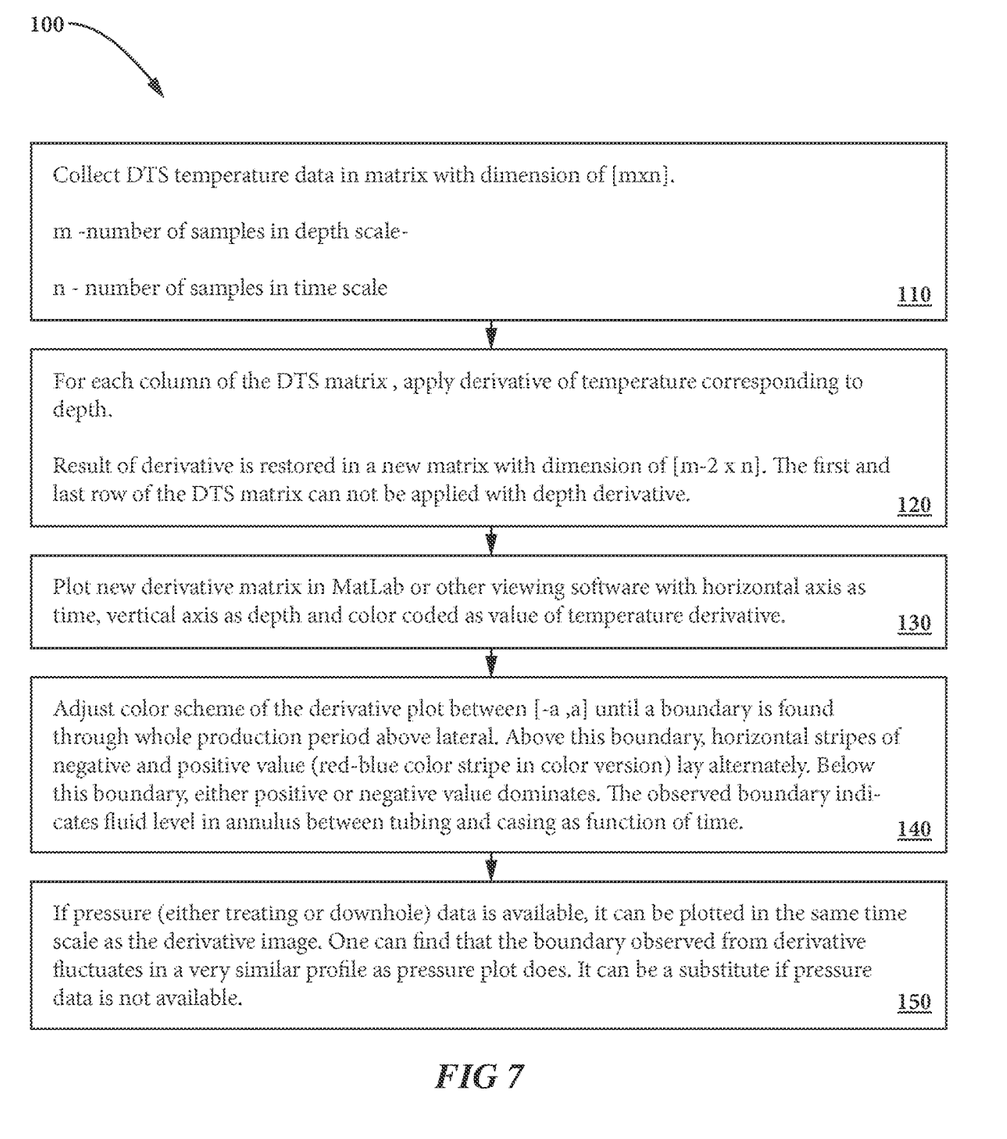
FIG. 7 illustrates a workflow for generating the data analysis for the identification.

The method can be described alternately with the process 100 as in FIG. 7. In the first step 110 a DTS system is used to collect the distributed temperature data into a DTS matrix with dimensions of [m×n], where m is the number of samples taken in the depth scale and n is the number of samples taken in time scale. In the step 120 for each column of the DTS matrix, the derivative of temperature corresponding to depth is calculated. The result of this derivative is stored in a new matrix with dimension [m−2×n]. The first and last row of the DTS matrix cannot be applied with the depth derivative. The developing depth derivative matrix is shown in FIG. 6. In the step 130 any viewing software such as MATLAB can be used to plot the derivative matrix with depth as the horizontal axis and depth as the vertical axis. If color display is operable the color can be coded as a value of temperature derivative. The user can then adjust (step 140) the color scheme of the derivative plot until a boundary across all of the time scale is clearly shown as in FIG. 1. The observed boundary then can indicate the fluid level in the annulus between the tubing and the casing as a function to time. Above this boundary, horizontal stripes of negative and positive value (red-blue color stripes in the color version) lay alternately. Below this boundary, either positive or negative value dominates. Finally, as indicated in step 150, if pressure data is available, it can be plotted in the same time scale as the derivative image and it is found that the boundary observed in the derivative plot fluctuates in a very similar profile as the pressure plot does. This can be a substitute if is pressure data is not available.

By default, MATLAB uses a Blue-Red color scheme represent the value of the temperature or value of the derivative. In the DTS plot if shown in color, shown in FIG. 1 blue represents a low temperature while red represents a high temperature. Again, as explained before, because color cannot be used in patent applications these are presented as gray scale images which still show the new possibilities of data presentation possible by the use of displayed color data.

In DTS the depth derivative (DTS depth gradient), blue represents a temperature decrease along the depth. Red represents a temperature increase along the depth. Large value in red zone indicates a large temperature increase per unit length. Large negative value in blue zone indicates a large temperature drop per unit length. Again because color cannot be used in patent applications these are presented as gray scale images which still show the new possibilities of data presentation possible by the use of displayed color data.

Figure 1:
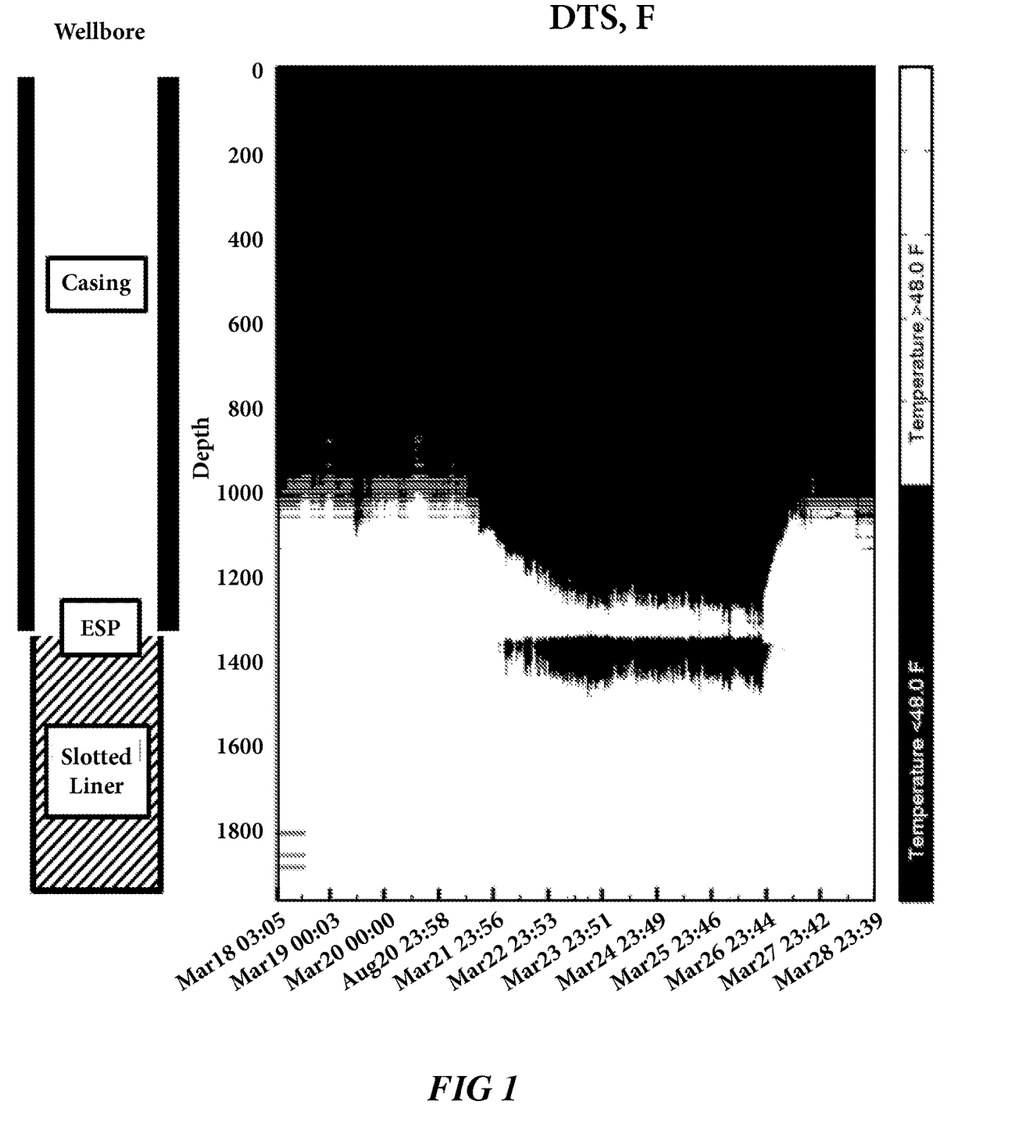
FIG. 1 illustrates an example of conventional DTS data displayed in the depth and time scale.

The resulting depth derivative temperature data as a function of depth and time can be presented in a number of ways. In one example the actual numerical values can be stored for later retrieval and then either displayed on a monitor or printed for study. In another example the resulting depth derivative of temperature can be displayed as different colors on a color display for better understanding and interpretation. In yet another example that same data can be displayed in black and white as shown in FIG. 1.

This methodology offers a more accurate monitoring tool than conventional distributed temperature sensing in the monitoring and analysis of fluid monitoring in subsurface wells.

Figure 5:
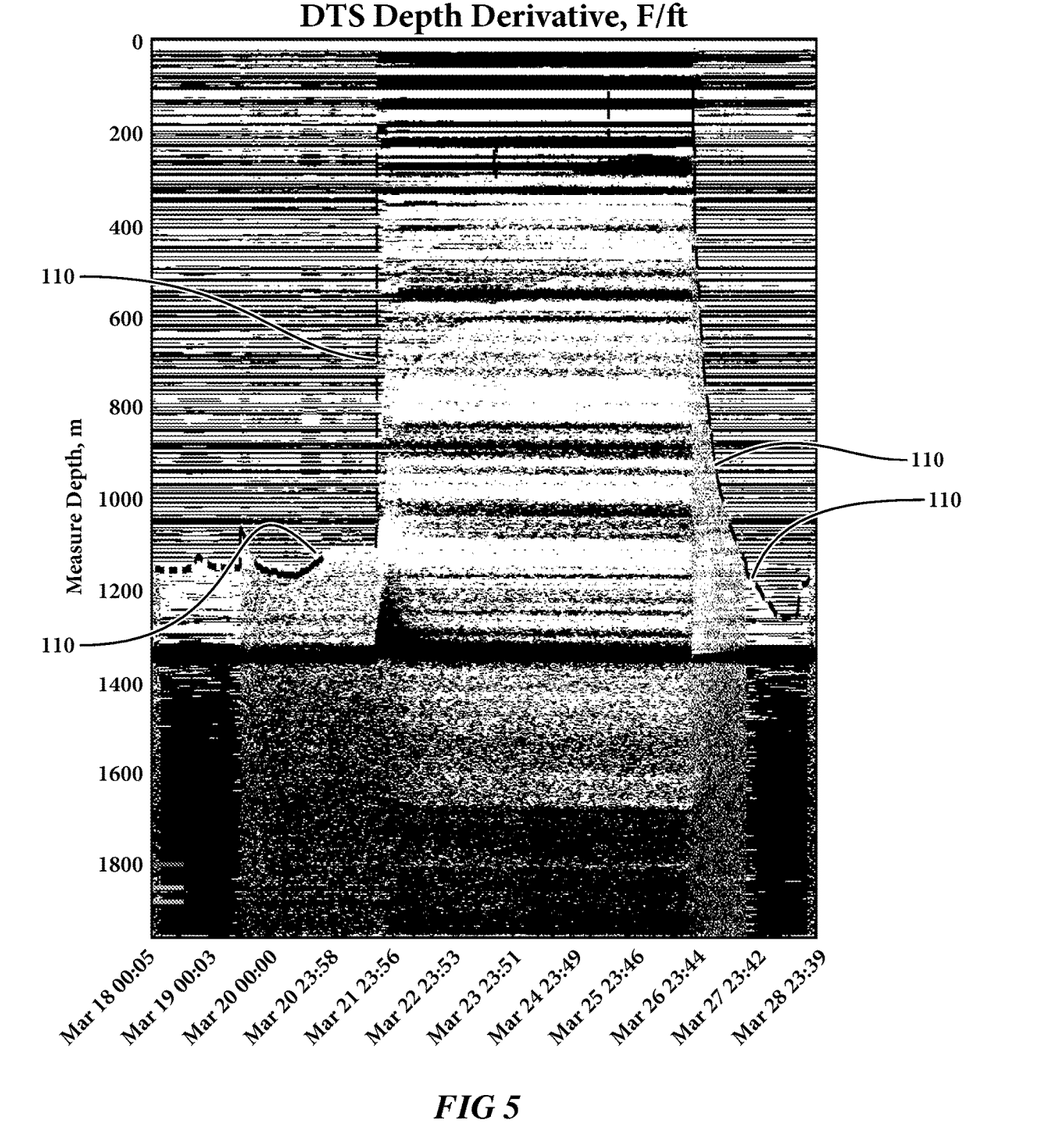
FIG. 5 illustrates the depth derivative of the DTS data consistent with the bottom hole pressure gauge readings of FIG. 4 and further illustrates the algorithm results for mathematically calculating a fluid level profile as a function of time, plotted as a dashed line on the derivative map.

Fluid Level Identification in the DTS Derivative Plot:

In this example the computation language MATLAB is used to apply the following algorithm to each DTS traces to find the boundary between high noise signal (above fluid level) and low noise signal (under fluid level). By connecting all results from each DTS traces, a boundary profile in time scale can be found in real time and exploited as pressure indicator. The dashed line in FIG. 5 represents the results of this automatic calculation. The data of FIG. 5 is the same as in FIG. 2 but with the algorithm applied to clearly indicate the boundaries. The algorithm reduces the need for expert visual interpretation of the results as it is done automatically.

At each time step, temperature derivative is only a function of depth. A variance can be computed as a function of depth by defining the window in 20 to 30 depths of the data that centered at the calculated depth:

$$T'_i = T'_i(d_i) = \frac{\partial T(d_i)}{\partial d}$$

$$d_i = d_1, d_2, d_3, d_4, d_5, \ldots$$

$$M_i = \frac{T'_{i-10} + T'_{i-9} + T'_{i-8} + \ldots + T'_{i-1} + T'_i + T'_{i+1} + \ldots + T'_{i+8} + T'_{i+9} + T'_{i+10}}{21}$$

$$\text{var}_i = \frac{\sqrt{(T'_i - M_i)^2}}{M_i}$$

At each time step $t_j$, a derivative variance as function of depths is computed, a threshold of the variance can be found by trial and error process that its corresponding depth is such a boundary where all variance of the derivative above is larger than the threshold and variance of the derivative below is smaller than the threshold. The same threshold variance can be applied to all derivative traces corresponding to each time step and a depth function with time can be created. This is the fluid level depth function corresponding to time.

$$FL(t_j) = d_i |_{\text{var}(d_i) = \text{var}_{\text{threshold}}}$$

The fluid level function with time is created by calibrating with visualization result on depth derivative map to decide a proper threshold variance. The threshold is adjusted until the calculated fluid level as function of time matches with the boundary visualized on a derivative map. The process is only required to be conducted once and the threshold variance can be applied to all later time steps in real time.

Although certain embodiments and their advantages have been described herein in detail, it should be understood that various changes, substitutions and alterations could be made without departing from the coverage as defined by the appended claims. Moreover, the potential applications of the disclosed techniques are not intended to be limited to the particular embodiments of the processes, machines, manufactures, means, methods and steps described herein. As a person of ordinary skill in the art will readily appreciate from this disclosure, other processes, machines, manufactures, means, methods, or steps, presently existing or later to be developed that perform substantially the same function or achieve substantially the same result as the corresponding embodiments described herein may be utilized. Accordingly, the appended claims are intended to include within their scope such processes, machines, manufactures, means, methods or steps.

The invention claimed is:

1. A method comprising:
   gathering temperatures through a production region at depths measured by a distributed temperature sensing system (DTS) in a subsurface well over time;
   calculating from the gathered temperatures depth derivatives, wherein a depth derivative of temperature is a rate of temperature change with respect to depth in the subsurface well;
   identifying a boundary between a first plurality of the depth derivatives with high fluctuation and a second plurality of the depth derivatives with low fluctuation wherein the boundary indicates a fluid level in the subsurface well over time.

2. The method of claim 1 further comprising displaying the depth derivatives in colors as a function of depth and time.

3. The method of claim 1 further comprising displaying the depth derivatives in black/white as a function of depth and time.

4. The method of claim 1 further comprising displaying the depth derivatives in grey scale as a function of depth and time.

5. The method of claim 1 further comprising:
   gathering acoustic velocity and amplitude over various frequencies from a distributed acoustic sensing system (DAS) in the subsurface well over time; and
   validating the boundary that indicates a fluid level based, at least in part, on changes in those of the acoustic velocities or amplitudes gathered at depths below the boundary versus those of the acoustic velocities or amplitudes gathered above the boundary in various frequency bands, wherein changes in the acoustic velocities or amplitudes in various frequency bands correspond to presence of a fluid.

6. The method of claim 1 further comprising:
   displaying a fluid level profile as a function of time based, at least in part, on the identified boundary in depth that indicates a fluid level.

7. The method of claim 1 wherein identifying the boundary between the first plurality of the depth derivatives with high fluctuation and the second plurality of the depth derivatives with low fluctuation comprises identifying a boundary variance value starting with 0.002±0.0015 and iterating to find a boundary variance value for which the plurality of the depth derivatives with high fluctuation correspond to the portion of the subsurface well above the fluid level and the plurality of the depth derivatives with low fluctuation correspond to the portion of the subsurface well below the fluid level.

8. The method of claim 1 further comprising:
   controlling at least one of electric submersible pump (ESP) flow rate or production rate based, at least in part, on the boundary.

9. The method of claim 1 further comprising:
   monitoring downhole pressure based, at least in part, on the boundary.

10. A method comprising:
    gathering temperatures through a production region at depths in a subsurface well over time;
    assembling the temperatures into a DTS matrix of [m×n] wherein m is the number of samples collected in the depth scale and n is the number of samples collected in the time scale;
    for each of n columns of the DTS matrix calculating m−2 depth derivatives, wherein a depth derivative of temperature is a rate of temperature change with respect to depth in the subsurface well, and storing these in a derivative matrix with dimensions [m−2×n], wherein m−2 is the number of depth derivatives calculated in the depth scale; and
    identifying a boundary between a first plurality of the depth derivatives with high fluctuation and a second plurality of the depth derivatives with low fluctuation, wherein the boundary indicates a fluid level in the subsurface well over time.

11. The method of claim 10 further comprising displaying the depth derivatives in color as a function of depth and time.

12. The method of claim 10 further comprising displaying the depth derivatives in gray scale as a function of depth and time.

13. The method of claim 10 further comprising displaying the depth derivatives in black and white as a function of depth and time.

14. The method of claim 10 further comprising:
    gathering acoustic velocity and amplitude over various frequencies from a distributed acoustic sensing system (DAS) in the subsurface well over time; and
    validating the boundary that indicates a fluid level based, at least in part, on changes in those of the acoustic velocities or amplitudes gathered at depths below the boundary versus those of the acoustic velocities or amplitudes gathered at depths above the boundary in various frequency bands, wherein changes in acoustic velocities or amplitudes in various frequency bands correspond to presence of a fluid.

15. The method of claim 10 wherein identifying the boundary between the first plurality of the depth derivatives with high fluctuation and the second plurality of the depth derivatives with low fluctuation comprises identifying a boundary variance value starting with 0.002±0.0015 and iterating to find a boundary variance value for which the plurality of the depth derivatives with high fluctuation correspond to the portion of the subsurface well above the fluid level and the plurality of the depth derivatives with low fluctuation correspond to the portion of the subsurface well below the fluid level.

16. The method of claim 10 further comprising:
    displaying a fluid level profile as a function of time based, at least in part, on the identified boundary in depth that indicates a fluid level.

17. A system claim comprising:
    a processor; and
    a non-transitory machine-readable medium having stored therein program code executable by the processor to cause the system to:
        gather temperatures at different depths in a subsurface well over time;
        calculate depth derivatives from the gathered temperatures, wherein a depth derivative of temperature is a rate of change of temperature with respect to depth in the subsurface well;

identify a boundary between a first plurality of the depth derivatives with high fluctuation and a second plurality of the depth derivatives with low fluctuation wherein the boundary indicates a fluid level in the subsurface well over time.

18. The system of claim 17, wherein the machine-readable medium further comprises program code executable by the processor to cause the system to:

display a fluid level profile as a function of time based, at least in part, on the identified boundary in depth that indicates a fluid level.

19. The system of claim 17, wherein the program code to identify a boundary between a first plurality of the depth derivatives with high fluctuation and a second plurality of the depth derivatives with low fluctuation comprises program code executable by the processor to cause the system to:

identify a boundary variance value starting with 0.002±0.0015; and iterate to find a boundary variance value for which the plurality of the depth derivatives with high fluctuation correspond to the portion of the subsurface well above the fluid level and the plurality of the depth derivatives with low fluctuation correspond to the portion of the subsurface well below the fluid level.

20. The non-transitory machine-readable medium of claim 17 further having stored therein program code executable by the processor to cause the system to:

gather acoustic velocity and amplitude over various frequencies from a distributed acoustic sensing system (DAS) in the subsurface well over time; and validate the boundary between the first plurality of the depth derivatives and the second plurality of the depth derivatives that indicates a fluid level based, at least in part, on changes in acoustic velocities or amplitudes gathered at depths below the boundary versus acoustic velocities or amplitudes gathered above the boundary in various frequency bands, wherein changes in acoustic velocities or amplitudes in various frequency bands correspond to presence of a fluid.

* * * * *